US012523022B2

(12) United States Patent
Wu et al.

(10) Patent No.: US 12,523,022 B2
(45) Date of Patent: Jan. 13, 2026

(54) SHOWER COLUMN WITH LIFTABLE SHOWERHEAD

(71) Applicant: Purity (Xiamen) Sanitary Ware Co., Ltd., Xiamen (CN)

(72) Inventors: James Wu, Taichung (TW); Alex Wu, Taichung (TW); Ce-Wen Yang, Xiamen (CN)

(73) Assignee: Purity (Xiamen) Sanitary Ware Co., Ltd., Xiamen (CN)

( * ) Notice: Subject to any disclaimer, the term of this patent is extended or adjusted under 35 U.S.C. 154(b) by 742 days.

(21) Appl. No.: 17/750,685

(22) Filed: May 23, 2022

(65) Prior Publication Data

US 2023/0374762 A1 Nov. 23, 2023

(51) Int. Cl.
*E03C 1/04* (2006.01)
*B05B 15/652* (2018.01)

(52) U.S. Cl.
CPC .......... *E03C 1/0408* (2013.01); *B05B 15/652* (2018.02); *E03C 2001/0414* (2013.01)

(58) Field of Classification Search
CPC . E03C 1/02; E03C 1/0408; B05B 1/18; B05B 15/652
See application file for complete search history.

(56) References Cited

U.S. PATENT DOCUMENTS 2,279,150 A * 4/1942 Thom ....................... E03C 1/06 285/302
3,913,839 A * 10/1975 Wilson ...................... E03C 1/06 239/269
4,360,159 A * 11/1982 Haynes ................... E03C 1/066 4/596
4,561,136 A * 12/1985 Baer ....................... E03C 1/066 4/615
4,914,759 A * 4/1990 Goff .......................... E03C 1/06 4/615
5,564,139 A * 10/1996 Shorr ..................... A47K 3/283 4/601
5,799,346 A * 9/1998 Tiernan .................... A47K 3/28 285/31

(Continued)

FOREIGN PATENT DOCUMENTS

CN 205518274 U * 8/2016
CN 112922097 A 6/2021

OTHER PUBLICATIONS

Extended European Search Report for European Application No. 22174288.5, dated Nov. 10, 2022.

*Primary Examiner* — Joseph A Greenlund
(74) *Attorney, Agent, or Firm* — Zhigang Ma

(57) ABSTRACT

A shower column with a liftable showerhead includes a faucet and a top base in which are connected by an outer rod. The faucet has a first outlet hole facing the outer rod. A front of the outer rod has an elongated hole extending along a top-bottom direction. An inner tube is engaged with the first outlet hole. A liftable tube slidably fits around an inner tube. A spring is provided between the liftable tube and the inner tube. A connecting base passes through the elongated hole and is connected between the liftable tube and a sprayhead of a showerhead structure. The sprayhead has several spraying holes communicating with an inside of the liftable tube. When using the present invention, the faucet and top base are engaged with a wall.

12 Claims, 13 Drawing Sheets

(56) References Cited

U.S. PATENT DOCUMENTS

| | | | | |
|---|---|---|---|---|
| 6,138,716 | A * | 10/2000 | Yen | E03C 1/0404 4/678 |
| 9,095,861 | B2 * | 8/2015 | Costello | B05B 1/185 |
| 9,242,259 | B2 * | 1/2016 | Jeronimus | B05B 7/0408 |
| 11,987,963 | B2 * | 5/2024 | Skaloud | E03C 1/06 |
| 2022/0251811 | A1 * | 8/2022 | Skaloud | B05B 15/628 |
| 2023/0374762 | A1 * | 11/2023 | Wu | B05B 15/652 |

* cited by examiner

SHOWER COLUMN WITH LIFTABLE SHOWERHEAD

BACKGROUND OF THE INVENTION

Technical Field

The present invention relates generally to a sanitary ware, and more particularly to a shower column with a liftable showerhead.

Description of Related Art

Conventional showerheads generally have a hose connected to a faucet. During controlling the faucet to output water, a plurality of spraying holes of the showerhead sprays out water columns for users to shower. With the aforementioned showerhead, a showerhead holder of the showerhead is provided on a wall of a bathroom. When users would like to empty two hands for shower, the showerhead could be fixed to the showerhead holder. At this time, users could shower under the showerhead.

The conventional showerheads allow the showerhead to be fixed to the showerhead holder, thereby allowing users to shower freely. However, usually only one showerhead holder is provided on the wall, or only one showerhead holder is provided at high position and at low position respectively, so that the position of fixing the showerhead is restricted by the position of the showerhead holder, and the height of the showerhead cannot be adjusted freely, which causes inconveniences and limitations in use.

BRIEF SUMMARY OF THE INVENTION

In view of the above, the primary objective of the present invention is to provide a shower column with a liftable showerhead, which could allow different users to freely adjust a height of the showerhead by providing a telescopic tube assembly connected to a water source and a showerhead.

The present invention provides a shower column with a liftable showerhead including a faucet, a top base, an outer rod, a telescopic tube assembly, and a showerhead structure. The faucet has a main body, wherein the main body has a first outlet hole. The top base has a connector and an upper base connected to the connector. The outer rod is a hollow tubing body, wherein two ends of the outer rod are engaged with the main body and the upper base respectively. The first outlet hole faces towards the outer rod. A front surface of the outer rod has an elongated hole which extends along a longitudinal direction of the outer rod. The telescopic tube assembly has an inner tube, wherein a bottom end of the inner tube along the longitudinal direction of the outer rod is engaged with the first outlet hole in a sealed way. A liftable tube slidably fits around the inner tube in a sealed way and has a liftable outlet hole communicating with the inner tube. A spring is provided inside the liftable tube and abuts against a top end of the inner tube along the longitudinal direction of the outer rod to be compressed by the liftable tube. The showerhead structure has a sprayhead and a connecting base connected to the sprayhead, wherein the sprayhead has a plurality of spraying holes. The connecting base has a connecting channel communicating with the spraying holes. The connecting base passes through the elongated hole and is detachably engaged with the liftable tube. The connecting channel communicates with the liftable outlet hole.

During installing of the present invention, the faucet and the top base are engaged with the wall of the bathroom. The faucet introduces the water source. When users need to shower, the height of the showerhead structure could be raised or lowered. During adjusting the height of the sprayhead, the liftable tube of the telescopic tube assembly would move with the height of the sprayhead, ensuring the continuous communication between the sprayhead and the water pathway in the telescopic tube assembly. After completing the adjustment of the height of the sprayhead, users control the faucet to control the first outlet hole to output water, allowing water to pass through the inner tube, the liftable tube, the liftable outlet hole, the connecting channel, and finally to be sprayed out from the spraying holes of the sprayhead for users to shower.

With the aforementioned design, the sprayhead of the showerhead structure could be raised or lowered by a certain height to meet various requirements of users at different heights. Alternatively, by adjusting the height of the water columns sprayed out from the sprayhead, users could focally rinse the destinated part, facilitating users to use.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
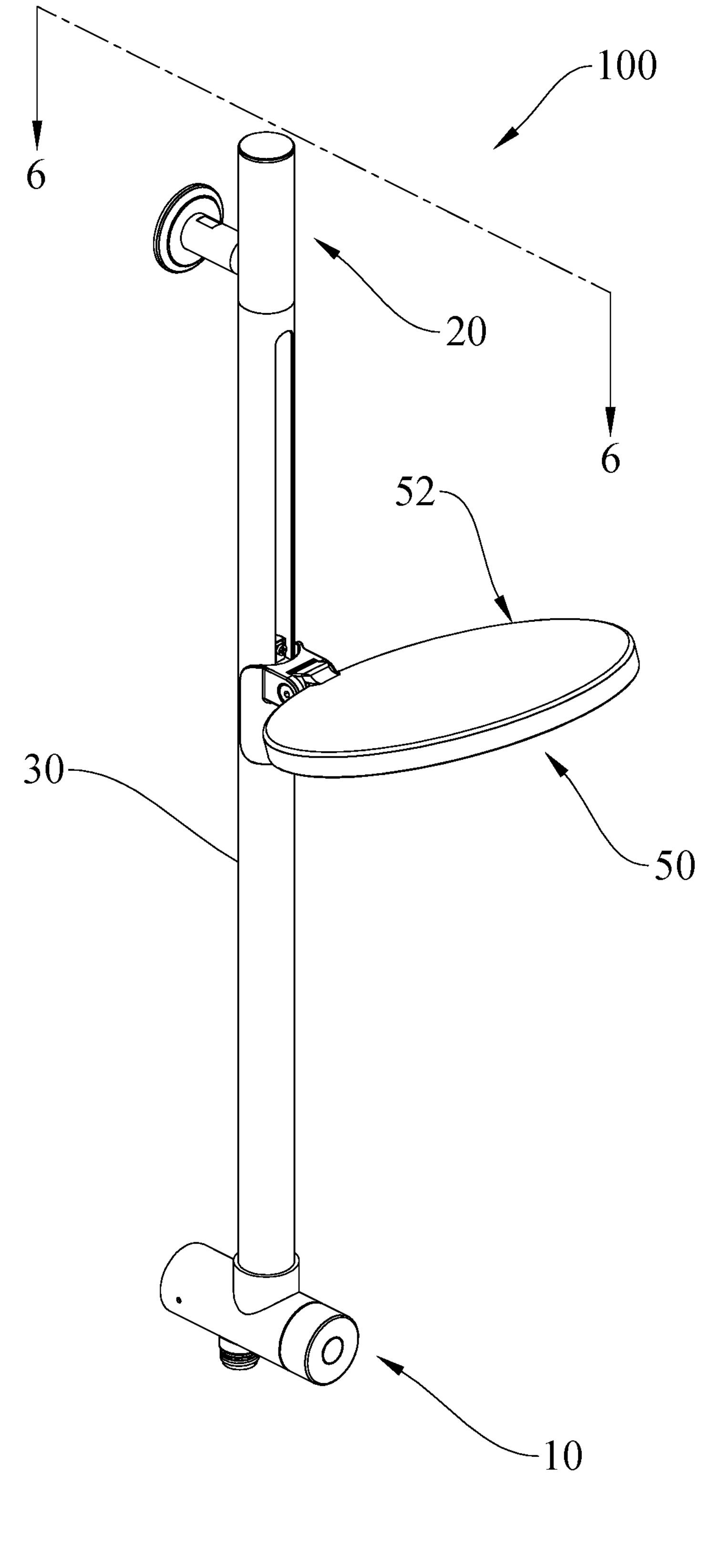
FIG. 1 is a perspective view of the shower column with the liftable showerhead according to a first embodiment of the present invention.

In the description below, the terms "top", "bottom", "front", "rear", "left", "right" and their derivatives, should be interpreted from the exploded view of the present invention in FIG. 2A. It is also understood that the terminology used herein is for the purpose of describing particular embodiments only, and is not intended to limit the scope of the present invention. A shower column with a liftable showerhead 100 according to a first embodiment of the present invention is illustrated in FIG. 1 to FIG. 6 and includes a faucet 10, a top base 20, an outer rod 30, a telescopic tube assembly 40, and a showerhead structure 50.

Figure 2A:
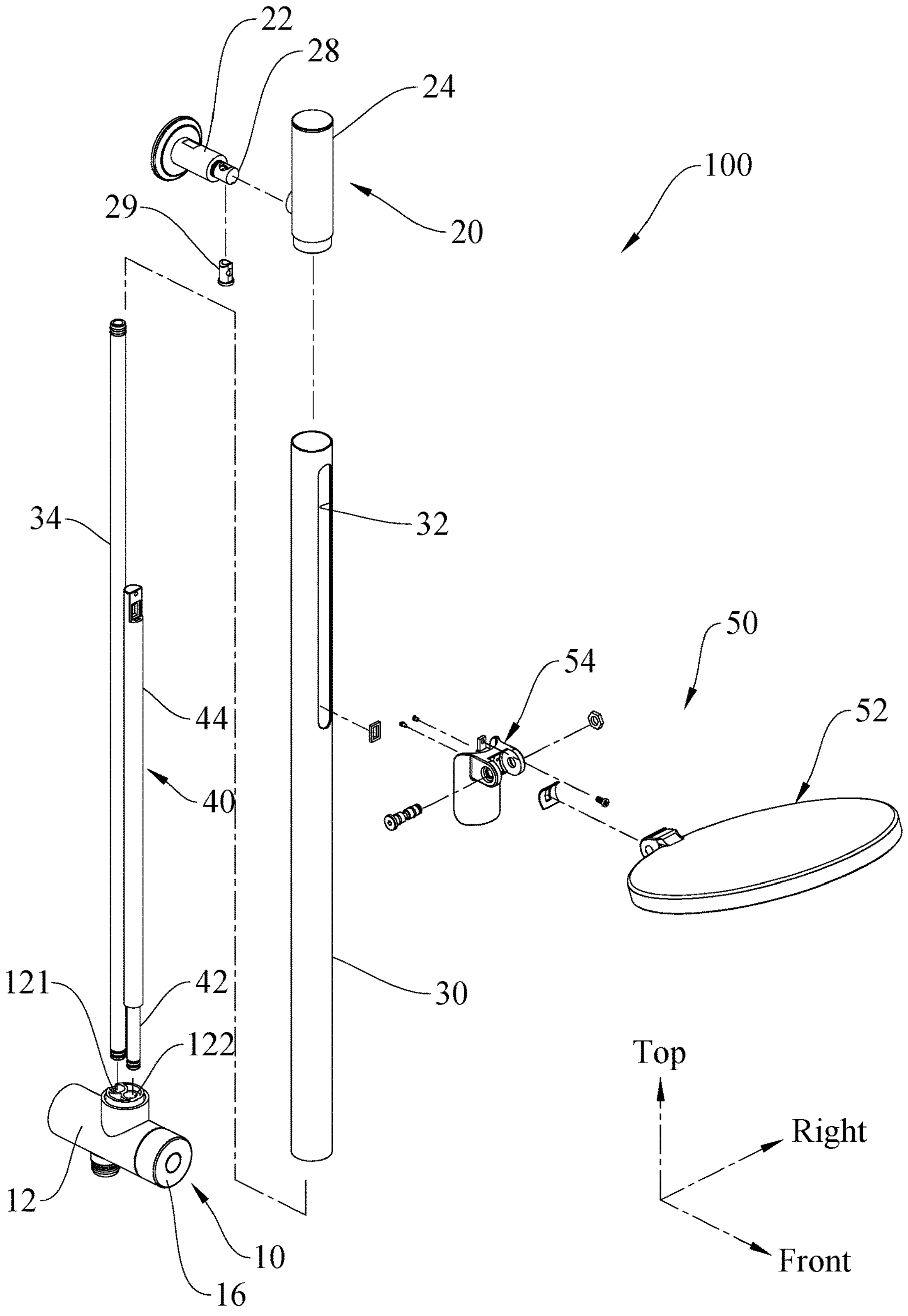
FIG. 2A is an exploded view of the shower column with the liftable showerhead according to the first embodiment of the present invention.
Figure 2B:
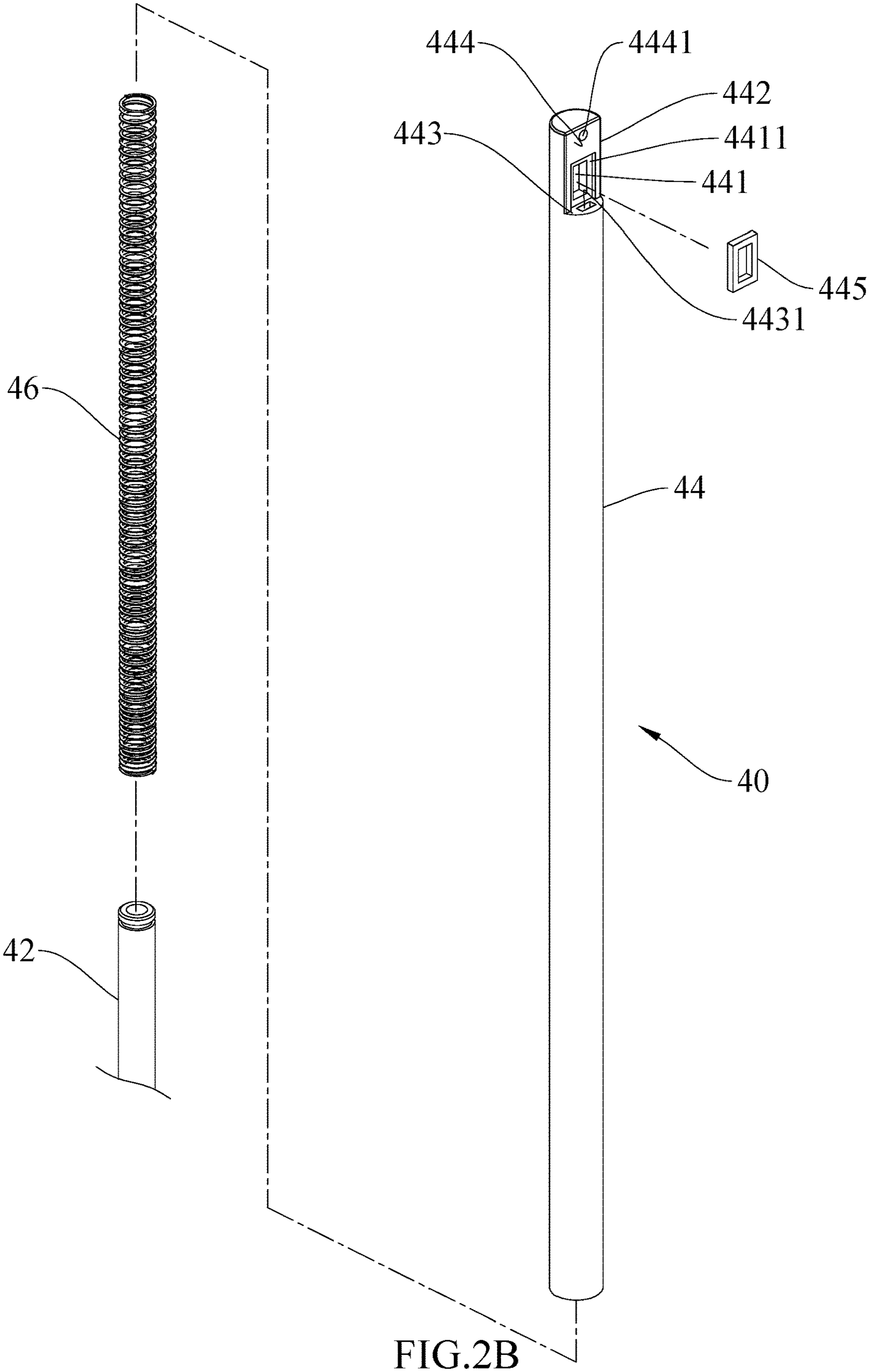
FIG. 2B is an exploded view of the telescopic tube assembly according to the first embodiment of the present invention.
Figure 3:
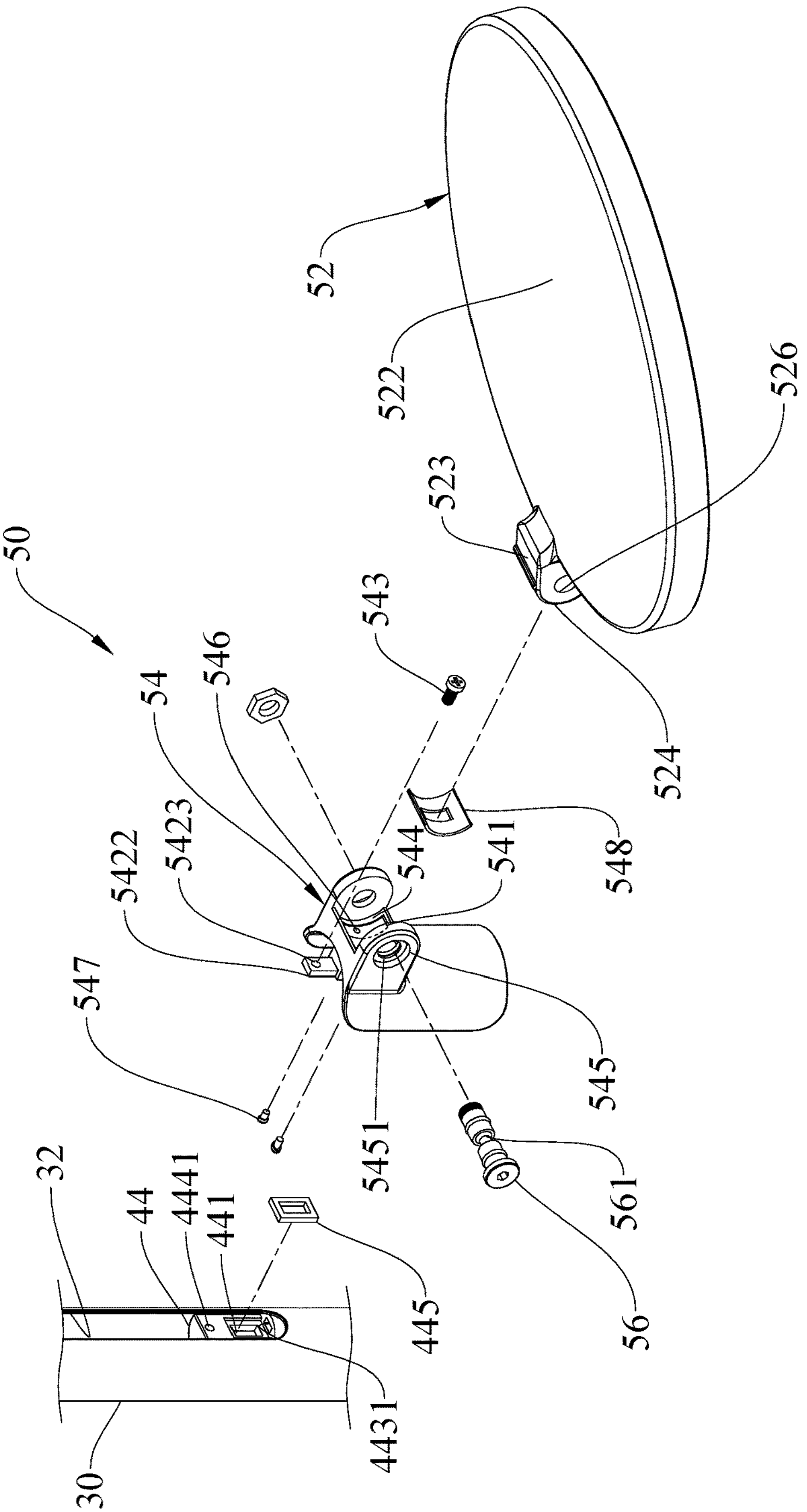
FIG. 3 is an exploded view of the showerhead structure and the liftable tube according to the first embodiment of the present invention.
Figure 4:
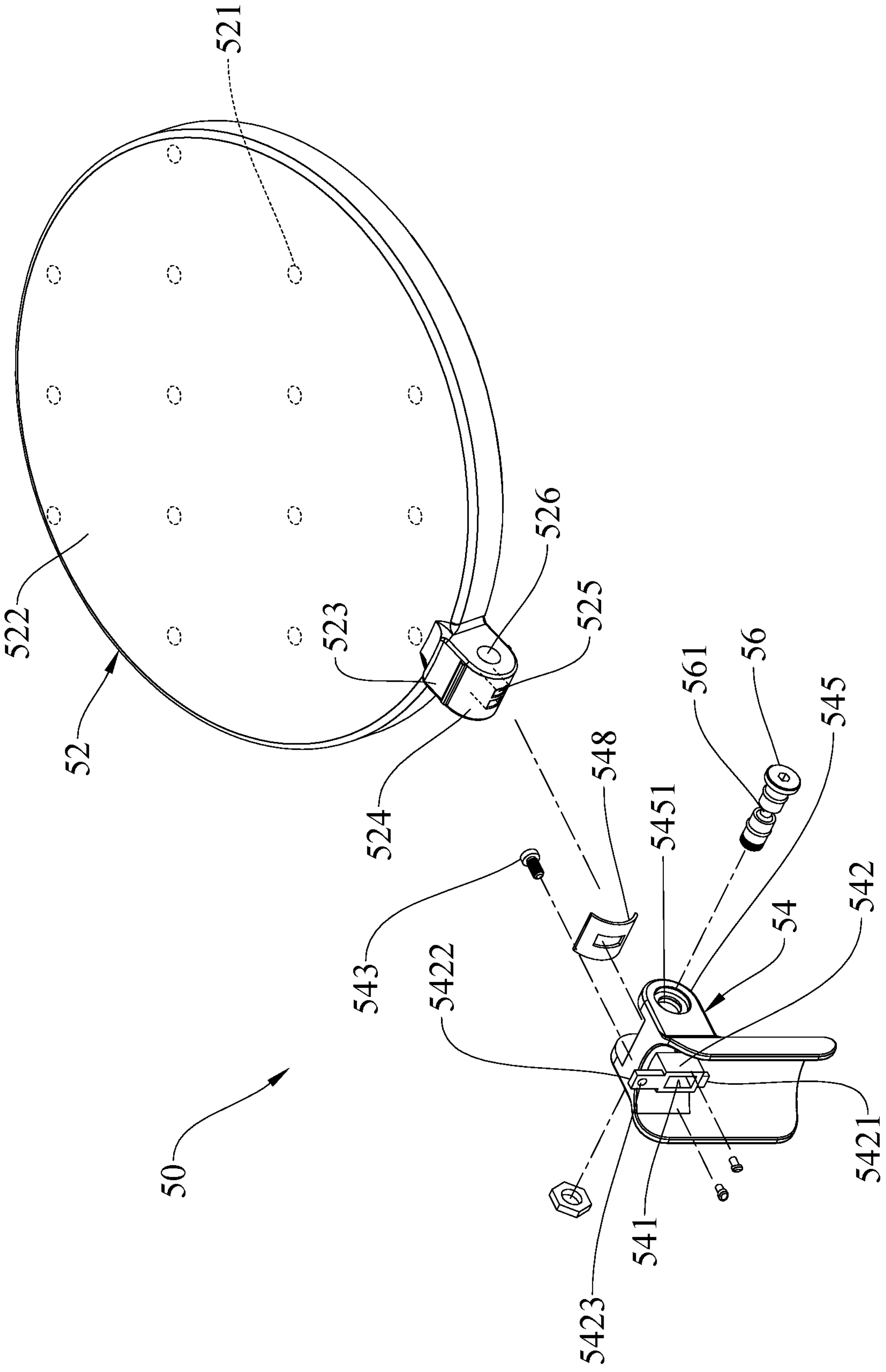
FIG. 4 is an exploded view of the sprayhead and the connecting base according to the first embodiment of the present invention.
Figure 5:
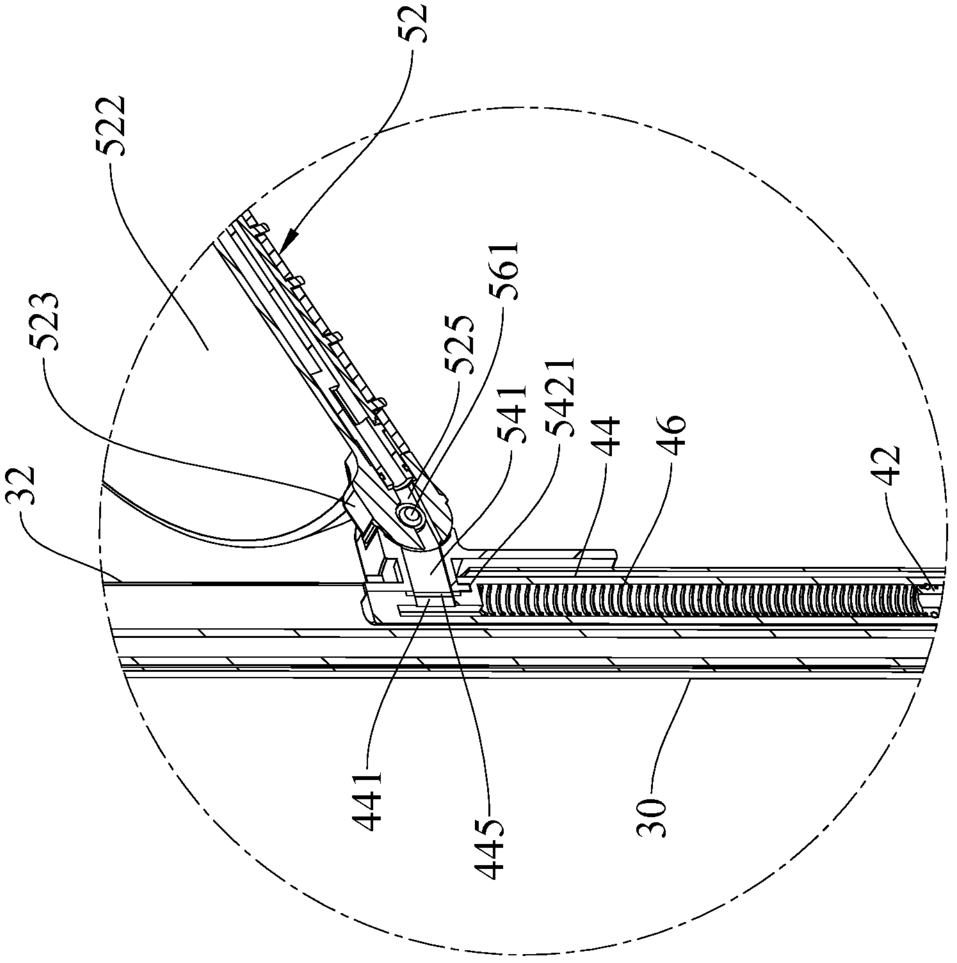
FIG. 5 is a sectional view of a part of the sprayhead according to the first embodiment of the present invention.
Figure 6:
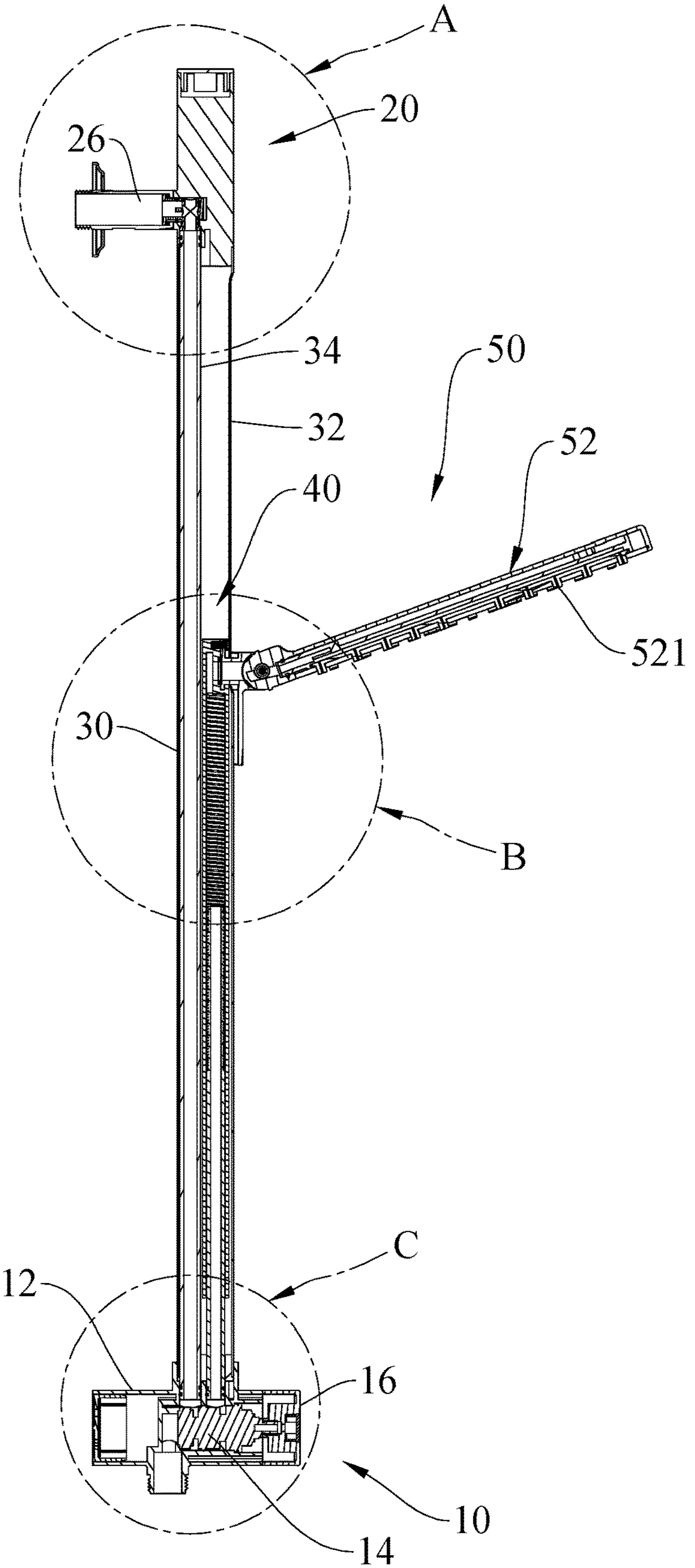
FIG. 6 is a sectional view along the 6-6 line in FIG. 1.
Figure 9:
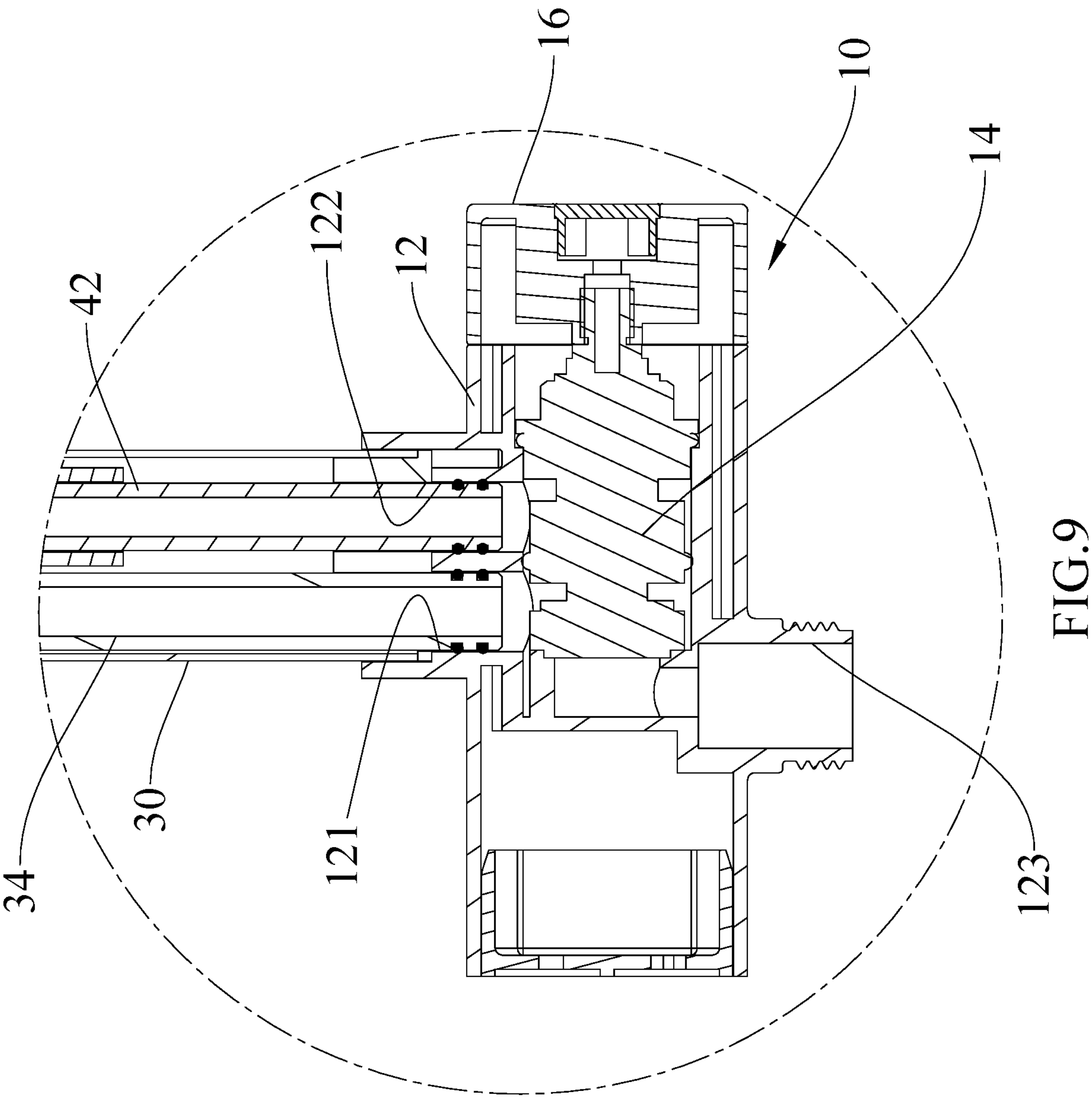
FIG. 9 is a partially enlarged view of a marked region C in FIG. 6.
Figure 10:
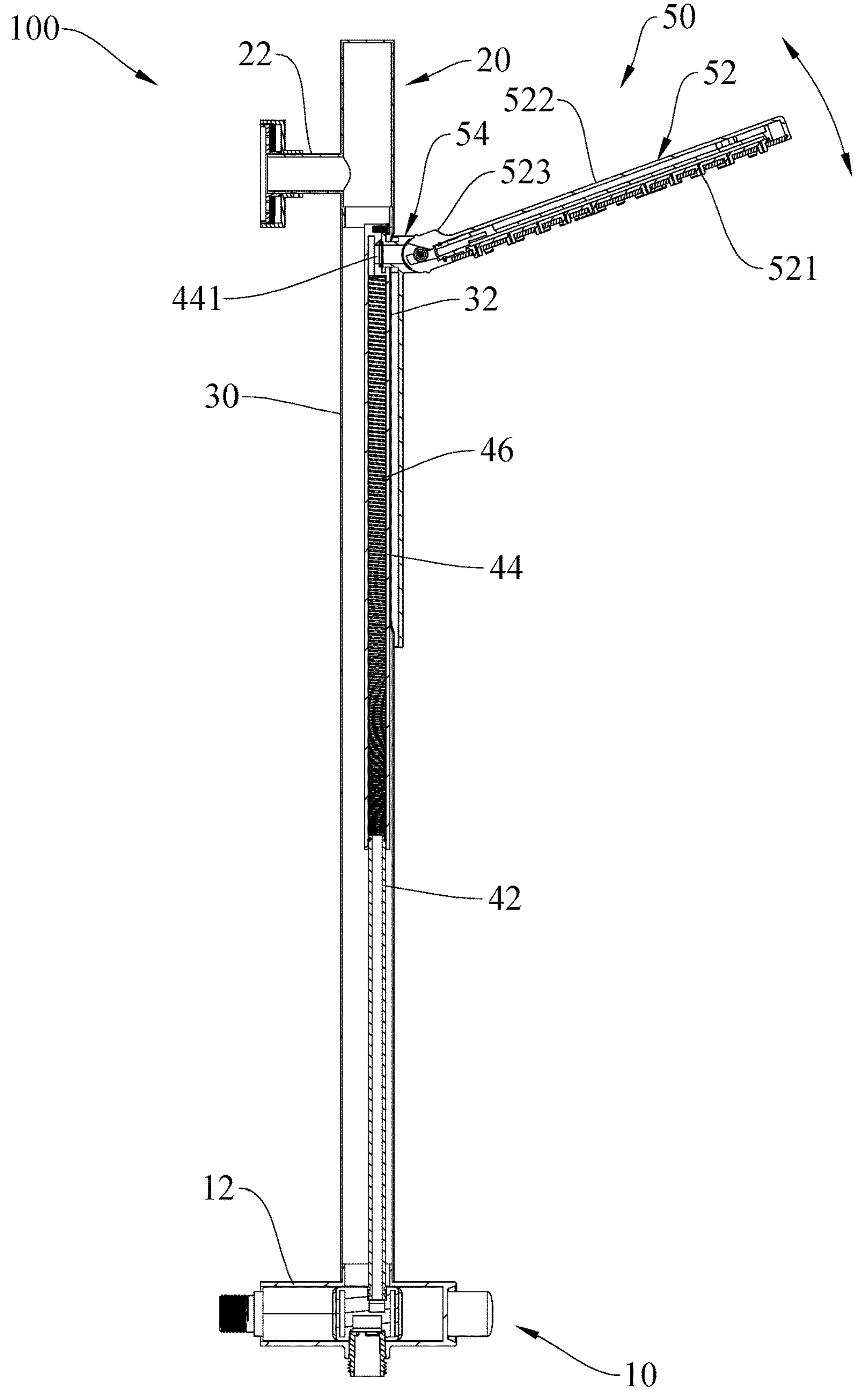
FIG. 10 is a schematic view illustrating a lifting motion of the sprayhead according to the first embodiment of the present invention.

As shown in FIG. 2A, FIG. 6, and FIG. 9, the faucet 10 has a main body 12, which is a tubular structure and has a first outlet hole 122 for outputting water to the telescopic tube assembly 40, wherein a rear end of the main body 12 is engaged with a wall of a bathroom. The faucet 10 is connected to the outer rod 30 through the main body 12, and is adapted to control the first outlet hole 122 to output water to the telescopic tube assembly 40.

The main body 12 has at least one inlet hole 121 for introducing a water source. In the current embodiment, the main body 12 provides with an inlet hole 121, wherein the inlet hole 121 and the first outlet hole 122 are provided on a top portion of the main body 12 and extend along a longitudinal direction of the outer rod 30 (i.e., a top-bottom direction). The first outlet hole 122 is located at a front side of the inlet hole 121. A valve 14 is provided in the main body 12. The inlet hole 121 and the first outlet hole 122 communicate with the valve 14. At least one controlling button 16 is disposed on the main body 12 and is connected to the valve 14 to control the communication between the inlet hole 121 and the first outlet hole 122. In the current embodiment, the inlet hole 121 is provided on the top portion of the main body 12. However, in other embodiments, the inlet hole 121 could be provided at the rear end of the main body 12 for communicating with a water pipe on the wall of the bathroom.

As shown in FIG. 1 to FIG. 6, the top base 20 has a connector 22 and an upper base 24, wherein a rear end portion of the connector 22 is adapted to engage with the wall of the bathroom, and the upper base 24 is engaged with a front end of the connector 22 that is opposite to the rear end of the connector 22. The outer rod 30 is provided along the top-bottom direction and is a hollow tubing body, wherein a top end of the outer rod 30 is connected to the upper base 24 of the top base 20, and a bottom end of the outer rod 30 is connected to the top portion of the main body 12 and fits around the periphery of both the inlet hole 121 and the first outlet hole 122, allowing a top end of the inlet hole 121 and a top end of the first outlet hole 122 to face towards inside the outer rod 30. A front surface of the outer rod 30 has an elongated hole 32 which extends along the top-bottom direction.

The telescopic tube assembly 40 has an inner tube 42, a liftable tube 44, and a spring 46, wherein the inner tube 42 is a tubing body extending along the top-bottom direction, and a bottom end of the inner tube 42 is engaged with the first outlet hole 122 in a sealed way. The liftable tube 44 is a tubing body extending along the top-bottom direction and fits around the inner tube 42 from top down in a sealed and slidable way. The liftable tube 44 has a liftable outlet hole 441 communicating with the inner tube 42. In the current embodiment, a top end of the liftable tube 44 is a closed end, and the liftable outlet hole 441 is provided on a front side of a top portion of the liftable tube 44 which is opposite to the wall. A spring 46 is provided in the liftable tube 44. In the current embodiment, the spring 46 is a constant force compression spring, wherein a bottom end of the spring 46 abuts against a top end of the inner tube 42, and a top end of the spring 46 abuts against an inner wall of the top portion of the liftable tube 44 to be compressed by the liftable tube 44.

The showerhead structure 50 has a sprayhead 52 and a connecting base 54. The sprayhead 52 has a plurality of spraying holes 521. The connecting base 54 is connected to the sprayhead 52 and has a connecting channel 541 therein, wherein the connecting channel 541 communicates with the spraying holes 521. The connecting base 54 penetrates through the elongated hole 32 of the outer rod 30, and is detachably engaged with the top portion of the liftable tube 44. The connecting channel 541 communicates with the liftable outlet hole 441 of the liftable tube 44.

During installing the shower column with the liftable showerhead 100 of the first embodiment, the main body 12 of the faucet 10 and the connector 22 of the top base 20 are engaged with a wall of a bathroom, wherein the faucet 10 introduces water source from the inlet hole 121 for shower. Referring to FIG. 6 to FIG. 10, when using the shower column with the liftable showerhead 100, the valve 14 could be adjusted through the controlling button 16 of the faucet 10, thereby adjusting the degree of the communication between the inlet hole 121 and the first outlet hole 122 to allow the first outlet hole 122 to output water. When water is outputted from the first outlet hole 122 of the faucet 10, water would pass through the inner tube 42, the liftable tube 44, and the liftable outlet hole 441, and would pass through the connecting channel 541 of the connecting base 54 to the spraying holes 521 of the sprayhead 52, and would finally be sprayed out as water columns from the spraying holes 521.

When a height of the showerhead structure 50 is about to be adjusted, users could push the sprayhead 52 to lift or decline, at this time the liftable tube 44 of the telescopic tube assembly 40 would change the height position with the movement of the sprayhead 52, wherein the liftable tube 44 would be lifted or declined in a sealed way along a tubing wall of an outer periphery of the inner tube 42 during such process. When the sprayhead 52 moves within the boundary of the elongated hole 32, the telescopic tube assembly 40 could continuously supply the water source to the showerhead structure 50 to spray out water columns by sliding, extending, and retracting the liftable tube 44 relative to the inner tube 42, thereby users could freely adjust a height of the sprayhead 52 before or during shower.

In the current embodiment, water is inputted from above the shower column with the liftable showerhead 100. As shown in FIG. 6 to FIG. 9, a bottom side of the main body 12 of the faucet 10 has a second outlet hole 123, and the controlling button 16 is connected to the valve 14 for controlling the inlet hole 121 to communicate with the first outlet hole 122 or the second outlet hole 123. An inlet channel 26 is formed in the connector 22 of the top base 20 and the upper base 24 for communicating with the water pipe on the wall of the bathroom. An inlet pipe 34 is provided in the outer rod 30, wherein a top end of the inlet pipe 34 is connected to a front end of the inlet channel 26 in a sealed way, and a bottom end of the inlet pipe 34 is connected to the inlet hole 121 of the faucet 10 in a sealed way, thereby allowing the inlet hole 121 to introduce water source from outside to the faucet 10.

Figure 7:
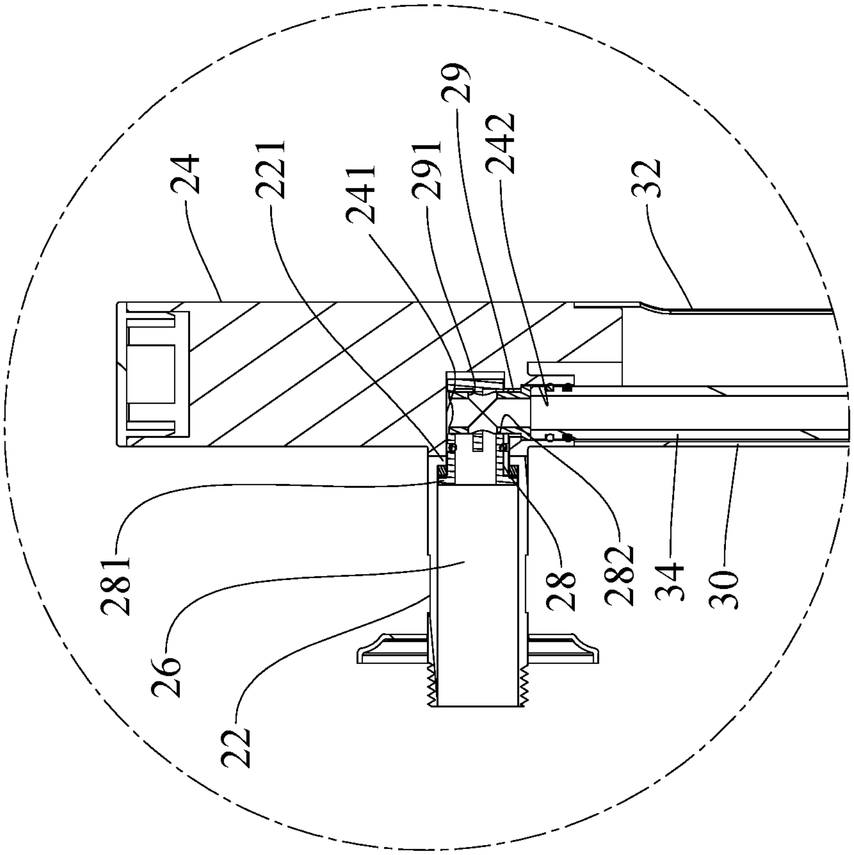
FIG. 7 is a partially enlarged view of a marked region A in FIG. 6.
Figure 8:
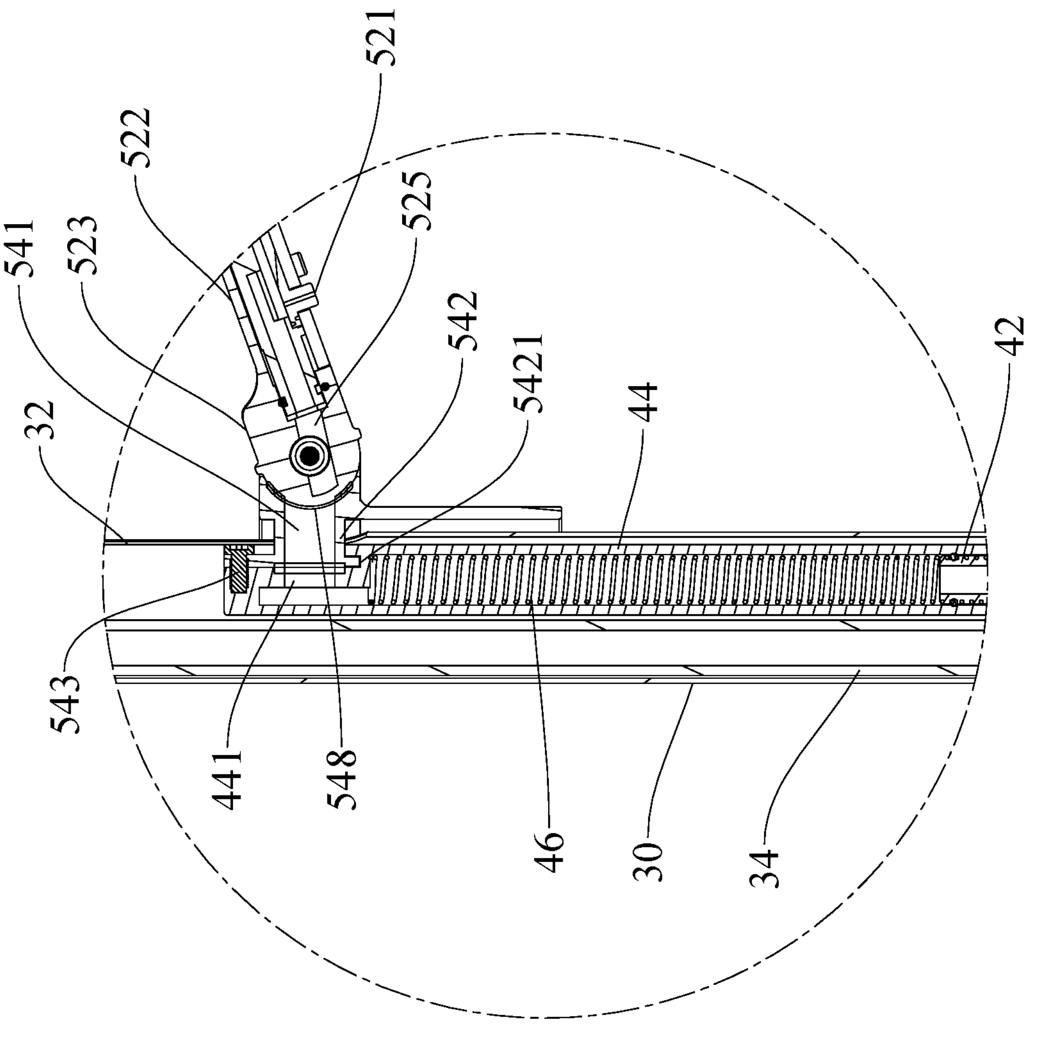
FIG. 8 is a partially enlarged view of a marked region B in FIG. 6.

As shown in FIG. 7, a rear side of the upper base 24 of the top base 20 has a rear hole 241, wherein a front end of the rear hole 241 is connected to and communicates with a bottom hole 242, and the bottom hole 242 is provided in the upper base 24 and open towards bottom. The connector 22 is a tubing body which extends along a front-rear direction, and an inner periphery of a front end of the connector 22 protrudes to form an inner protrusion 221 which is annular, wherein a locking tube 28 passes through the inner protrusion 221. A front end of the locking tube 28 is inserted into the rear hole 241 in a sealed way, and an outer periphery of a rear end of the locking tube 28 protrudes to form an outer protrusion 281 which is annular and abuts against the inner protrusion 221 in a sealed way. A first through hole 282 penetrates through a front end portion of the locking tube 28 along a radial direction of the locking tube 28 at a position aligned with the bottom hole 242, wherein the first through hole 282 communicates with the bottom hole 242. A tubular pin 29 passes through the bottom hole 242 and the first through hole 282, wherein a portion of the tubular pin 29 located inside the first through hole 282 has a second through hole 291 penetrating along a radial direction of the tubular pin 29 (i.e., the front-rear direction). The inlet channel 26 is formed in the connector 22, the locking tube 28, and the tubular pin 29. The top end of the inlet pipe 34 is inserted into the bottom hole 242 in a sealed way and abuts against a bottom end of the tubular pin 29, thereby the inlet pipe 34 is connected to the front end of the inlet channel 26 in a sealed way.

As shown in FIG. 2A to FIG. 5, the front side of the top portion of the liftable tube 44 forms a recess 442, wherein a bottom side of the recess 442 has a locking surface 443 and a rear side of the recess 442 has a connecting surface 444. The locking surface 443 has a locking groove 4431. The liftable outlet hole 441 penetrates through a middle of the connecting surface 444, wherein an annular recess 4411 is recessed into the connecting surface 444 around an outer end periphery of the liftable outlet hole 441 which faces towards the front side of the top portion of the liftable tube 44. A sealing ring 445 is disposed in the annular recess 4411. An engaging screw hole 4441 is provided on the connecting surface 444 which is above the liftable outlet hole 441 in the top-bottom direction.

A rear end of the connecting base 54 has a connecting tube 542 that matches with the recess 442 of the liftable tube 44. The connecting channel 541 passes through the connecting tube 542, wherein the connecting tube 542 opens at a rear end of the connecting channel 541. A bottom portion of the connecting tube 542 has a protrusion 5421, wherein the protrusion 5421 is inserted into the locking groove 4431. A rear end periphery of the connecting tube 542 abuts against the sealing ring 445, allowing the liftable outlet hole 441 to communicate with the connecting channel 541 in a sealed way. A top portion of the connecting tube 542 has a protruding member 5422, wherein the protruding member 5422 has a through hole 5423 which passes through along the front-rear direction. An engaging screw 543 passes through the through hole 5423 to be engaged with the engaging screw hole 4441, thereby allowing the connecting base 54 to be detachably engaged with the liftable tube 44.

In the current embodiment, the sprayhead 52 is designed in a way that an angle between the sprayhead 52 and the connecting base 54 is adjustable, thereby not only the height of the sprayhead 52 of the showerhead structure 50 could be adjusted but also allowing a direction that water columns spray out from spraying holes 521 to be adjusted by the way of pivoting the sprayhead 52 relative to the connecting base 54. As shown in FIG. 2A to FIG. 5, a front surface of the connecting base 54 has a first curved surface 544 which curves along the top-bottom direction. The connecting channel 541 extends frontward and passes through a middle of the first curved surface 544. Two screw holes 546 penetrate through a left side and a right side of the first curved surface 544 along the front-rear direction, wherein each of the screw holes 546 is adapted to be engaged with a screw 547. The two screws 547 are respectively located on a left side and a right side of the connecting channel 541. Two pivot arms 545 respectively extend frontward from the left side and the right side of the first curved surface 544, wherein each of the two pivot arms 545 has an outer axial hole 5451 penetrating through a middle of the corresponding pivot arm 545 along a left-right direction.

The sprayhead 52 includes a head 522 and a pivot base 523, the pivot base 523 is connected to a rear end of the head 522 and is provided between the two pivot arms 545, wherein a rear surface of the pivot base 523 has a second curved surface 524 which curves along the top-bottom direction. An annular gasket 548 is disposed between the first curved surface 524 and the second curved surface 544. The spraying holes 521 are provided on a bottom surface of the head 522. A delivering channel 525 is formed in the pivot base 523, wherein a front end of the delivering channel 525 communicates with the spraying holes 521, and a rear end of the delivering channel 525 passes through a middle of the second curved surface 524, allowing the delivering channel 525 to communicate with the connecting channel 541 of the connecting base 54 in a sealed way. In practice, the annular gasket 548 is not limited to a circular shape, but could be a gasket in different shapes which has a through hole (for example: a quadrilateral gasket with a through hole).

The pivot base 523 has an inner axial hole 526 which penetrates through the pivot base 523 along the left-right direction, wherein a middle of the inner axial hole 526 communicates with the delivering channel 525, and two ends of the inner axial hole 526 are connected to and communicate with the outer axial hole 5451. A bolt and nut assembly 56 passes through and is engaged with the outer axial hole 5451 and inner axial hole 526, allowing the sprayhead 52 to be pivotally connected to the connecting base 54 via the pivot base 523 to pivot to adjust the angle relative to the connecting base 54. A middle of the bolt and nut assembly 56 forms a neck 561 at a position matching with the delivering channel 525, thereby increasing the amount of water passing through the neck 561 from the delivering channel 525. A front end of each of the two screws 547 opposite to a head thereof abuts against the annular gasket 548 to adjust a tightness that the annular gasket 548 compressing against the second curved surface 524, wherein a friction between the annular gasket 548 and the second curved surface 524 provides a resistance for the sprayhead 52 to stay at a certain angle relative to the connecting base 54, preventing the sprayhead 52 from hanging down relative to the connecting base 54.

Figure 11:
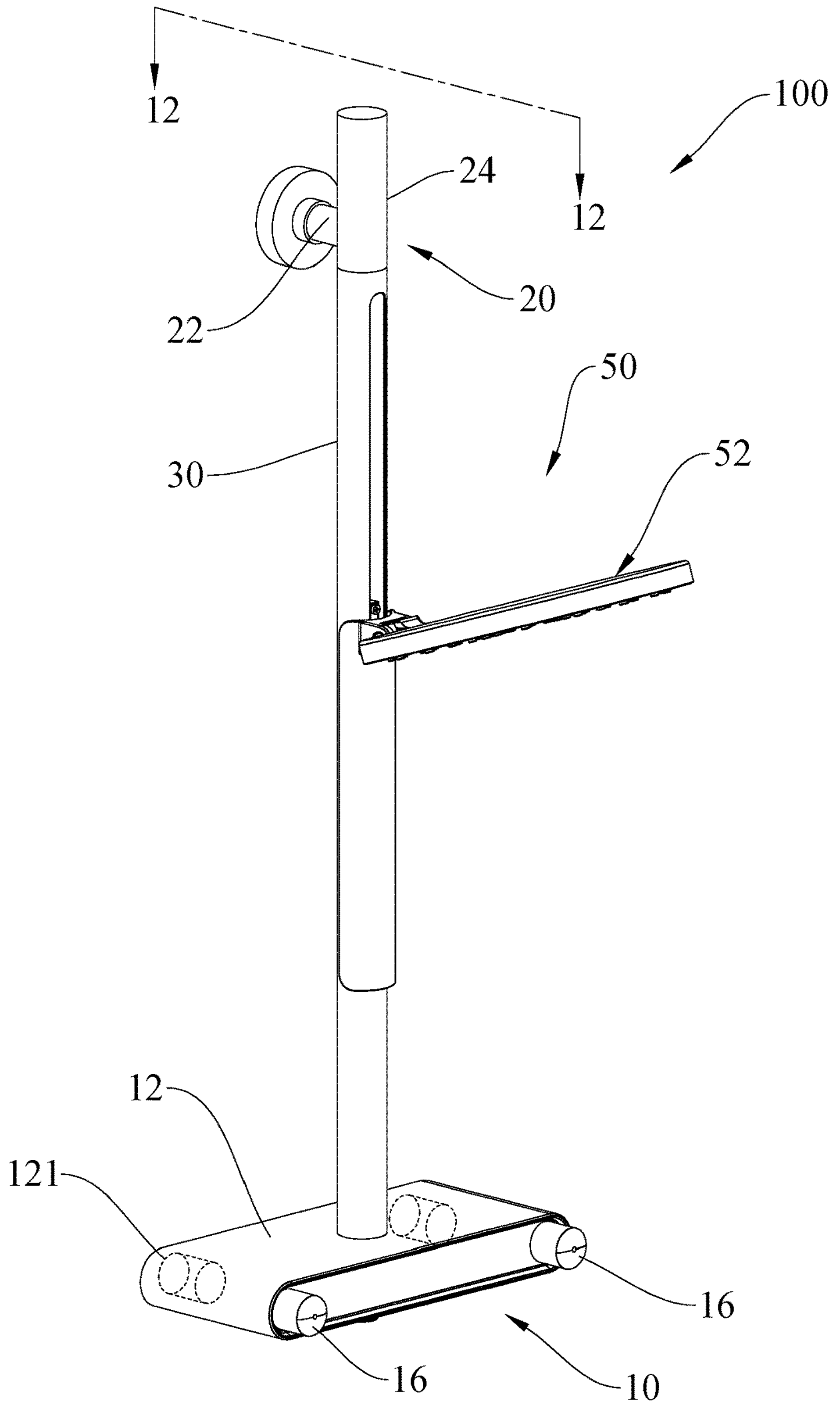
FIG. 11 is a perspective view of the shower column with the liftable showerhead according to a second embodiment of the present invention.
Figure 12:
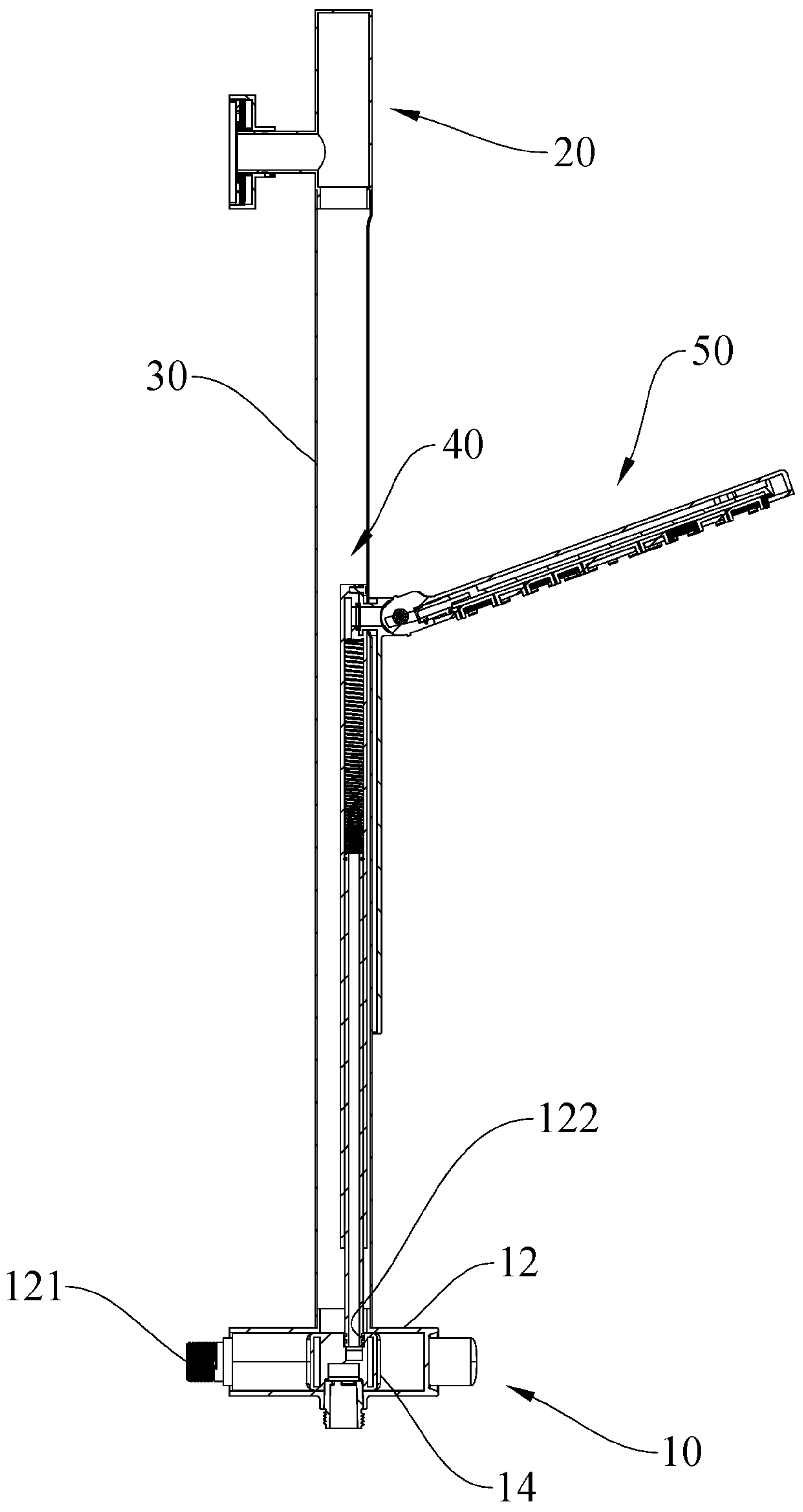
FIG. 12 is a sectional view along the 12-12 line in FIG. 11.

Apart from the aforementioned first embodiment of the present invention which is designed for water inputting from the top, a shower column with a liftable showerhead 100 according to a second embodiment of the present invention is illustrated in FIG. 11 and FIG. 12 and is designed for water inputting from the bottom.

In the second embodiment, the inlet channel 26 inside the top base 20 is omitted. The connector 22 and the upper base 24 are only for the purpose of fixing the top end of the outer rod 30. At least one inlet hole 121 of the faucet 10 is provided at a rear end of the main body 12. More specifically, the faucet 10 has two inlet holes 121 provided on a left side and a right side of a rear surface of the main body 12, so that each of the inlet holes 121 is connected to a water pipe on a wall of a bathroom when the main body 12 is engaged with the wall of the bathroom. Accompanying with the structure of the two inlet holes 121, two aforementioned controlling buttons 16 are respectively provided on a left side and a right side of a front surface of the main body 12. Similarly, a valve 14 is provided in the main body 12, wherein each of the inlet holes 121 and the first outlet hole 122 respectively communicate with the valve 14. Each of the controlling buttons 16 is connected to the valve 14 to control the communication between each of the inlet holes 121 and the first outlet hole 122.

In the second embodiment, the structures of the outer rod 30, the telescopic tube assembly 40, and the showerhead structure 50 are the same as that of the first embodiment; the way of adjusting the height of the showerhead structure 50 and the way of adjusting the angle of the sprayhead 52 are the same as that of the first embodiment as well.

It must be pointed out that the embodiments described above are only some preferred embodiments of the present invention. All equivalent structures which employ the concepts disclosed in this specification and the appended claims should fall within the scope of the present invention.

What is claimed is:

1. A shower column with a liftable showerhead, comprising:

a faucet having a main body, wherein the main body has a first outlet hole;

a top base having a connector and an upper base connected to the connector;

an outer rod which is a tube body, wherein two ends of the outer rod are engaged with the main body and the upper base respectively; the first outlet hole faces towards the outer rod, and a front surface of the outer rod has an elongated hole which extends along a longitudinal direction of the outer rod;

a telescopic tube assembly having an inner tube, wherein a bottom end of the inner tube along the longitudinal direction of the outer rod is engaged with the first outlet hole in a sealed way; a liftable tube slidably fits around the inner tube in a sealed way, and has a liftable outlet hole communicating with the inner tube; a spring is provided inside the liftable tube and abuts against a top end of the inner tube along the longitudinal direction of the outer rod to be compressed by the liftable tube; and a showerhead structure having a sprayhead and a connecting base connected to the sprayhead, wherein the sprayhead has a plurality of spraying holes; the connecting base has a connecting channel communicating with the spraying holes; the connecting base passes through the elongated hole and is detachably engaged with the liftable tube; the connecting channel communicates with the liftable outlet hole;

wherein a recess is formed on a front side, which faces towards the elongated hole, of a top portion of the liftable tube, which is away from the faucet; a bottom side of the recess along the longitudinal direction of the outer rod has a locking groove; the recess has a connecting surface facing towards the elongated hole; the liftable outlet hole passes through a middle of the connecting surface; an engaging screw hole is provided on the connecting surface which is above the liftable outlet hole in the longitudinal direction of the outer rod; the connecting base has a connecting tube facing towards the liftable outlet hole, wherein the connecting channel passes through the connecting tube; a bottom portion of the connecting tube which faces towards the faucet has a protrusion and the protrusion is inserted to the locking groove; the connecting tube communicates with the liftable outlet hole; a protruding member is disposed on a top portion of the connecting tube opposite to the faucet and has a through hole which passes through the protruding member along a direction from the liftable outlet hole to the connecting tube; an engaging screw passes through the through hole to be engaged with the engaging screw hole.

2. The shower column with the liftable showerhead as claimed in claim 1, wherein a front surface of the connecting base which is away from the elongated hole has a first curved surface which curves along a top-bottom direction; the connecting channel passes through a middle of the first curved surface, wherein a left side and a right side of the first curved surface extend two pivot arm in a direction away from the elongated hole, an outer axial hole horizontally passes through two pivot arms; the sprayhead has a head and a pivot base connected to a rear end of the head which faces towards the connecting base, wherein the pivot base is provided between the two pivot arms and has a second curved surface facing towards the connecting base; a annular gasket is held between the second curved surface and the first curved surface; the spraying holes are provided at the head, and a delivering channel is formed in the pivot base; a front end of the delivering channel facing towards the head communicates with the spraying holes, and a rear end of the delivering channel facing towards the connecting base passes through a middle of the second curved surface; the delivering channel communicates with the connecting channel in a sealed way; an inner axial hole horizontally passes through two sides of the pivot base; a middle of the inner axial hole communicates with the delivering channel, and two ends of inner axial hole connects and communicates with the outer axial hole; a bolt and nut assembly passes through and is engaged with the outer axial hole and inner axial hole, wherein a middle of the bolt and nut assembly forms a neck at a position matching with the delivering channel.

3. The shower column with the liftable showerhead as claimed in claim 1, wherein the main body has a valve and an inlet hole communicating with the first outlet hole which is controlled by the valve; the inlet hole faces towards the outer rod; an inlet channel is formed in the connector and the upper base; an inlet pipe is provided in the outer rod, wherein a top end of the inlet pipe away from the faucet is connected to a front end of the inlet channel which faces towards the top base in a sealed way, and a bottom end of the inlet pipe which faces towards the faucet is engaged with the inlet hole in a sealed way.

4. The shower column with the liftable showerhead as claimed in claim 3, wherein a rear side of the upper base which faces towards of the connector has a rear hole; a front end of the rear hole away from the connector is connected to a bottom hole which opens towards bottom; the connector is a tubing body, wherein an inner periphery of a front end of the connector which faces towards the upper base protrudes to form an inner protrusion that is annular; a locking tube passes through the inner protrusion; a front end of the locking tube away from the connector is inserted to the rear hole in a sealed way; an outer periphery of a rear end of the locking tube which faces towards the connector protrudes to form an outer protrusion which is annular, wherein the outer protrusion abuts against the inner protrusion in a sealed way; the locking tube has a first through hole communicating with the bottom hole; a tubular pin passes through the bottom hole and the first through hole; a portion of the tubular pin located in the first through hole has a second through hole; the inlet channel is formed in the connector, the locking tube, and the tubular pin; the top end of the inlet pipe away from the faucet is inserted to the bottom hole in a sealed way and abuts against the tubular pin.

5. The shower column with the liftable showerhead as claimed in claim 3, wherein a bottom side of the main body away from the outer rod has a second outlet hole; a controlling button is disposed on a front end of the main body and is connected to the valve to control a communication between the inlet hole and the second outlet hole.

6. The shower column with the liftable showerhead as claimed in claim 1, wherein the main body has a valve and an inlet hole communicating with a first outlet hole which is controlled by the valve; the inlet hole is provided on a rear end of the main body; a controlling button is disposed on a front end of the main body opposite to the rear end of the main body, and is connected to the valve to control a communication between the inlet hole and the first outlet hole.

7. The shower column with the liftable showerhead as claimed in claim 1, wherein the main body has a valve and two inlet holes that are provided on a rear surface of the main body; two controlling buttons are provided on a front surface of the main body opposite to the rear surface of the main body; each of the controlling buttons is connected to the valve to control a communication between each of the inlet holes and the first outlet hole.

8. The shower column with the liftable showerhead as claimed in claim 1, wherein the spring is a constant force compression spring.

9. The shower column with the liftable showerhead as claimed in claim 3, wherein the spring is a constant force compression spring.

10. The shower column with the liftable showerhead as claimed in claim 4, wherein the spring is a constant force compression spring.

11. A shower column with a liftable showerhead, comprising:

a faucet having a main body, wherein the main body has a first outlet hole;

a top base having a connector and an upper base connected to the connector;

an outer rod which is a tube body, wherein two ends of the outer rod are engaged with the main body and the upper base respectively; the first outlet hole faces towards the outer rod, and a front surface of the outer rod has an elongated hole which extends along a longitudinal direction of the outer rod;

a telescopic tube assembly having an inner tube, wherein a bottom end of the inner tube along the longitudinal direction of the outer rod is engaged with the first outlet hole in a sealed way; a liftable tube slidably fits around the inner tube in a sealed way, and has a liftable outlet hole communicating with the inner tube; a spring is provided inside the liftable tube and abuts against a top end of the inner tube along the longitudinal direction of the outer rod to be compressed by the liftable tube; and a showerhead structure having a sprayhead and a connecting base connected to the sprayhead, wherein the sprayhead has a plurality of spraying holes; the connecting base has a connecting channel communicating with the spraying holes; the connecting base passes through the elongated hole and is detachably engaged with the liftable tube; the connecting channel communicates with the liftable outlet hole;

wherein a front surface of the connecting base which is away from the elongated hole has a first curved surface which curves along a top-bottom direction; the connecting channel passes through a middle of the first curved surface, wherein a left side and a right side of the first curved surface extend two pivot arm in a direction away from the elongated hole, an outer axial hole horizontally passes through two pivot arms; the sprayhead has a head and a pivot base connected to a rear end of the head which faces towards the connecting base, wherein the pivot base is provided between the two pivot arms and has a second curved surface facing towards the connecting base; a annular gasket is held between the second curved surface and the first curved surface; the spraying holes are provided at the head, and a delivering channel is formed in the pivot base; a front end of the delivering channel facing towards the head communicates with the spraying holes, and a rear end of the delivering channel facing towards the connecting base passes through a middle of the second curved surface; the delivering channel communicates with the connecting channel in a sealed way; an inner axial hole horizontally passes through two sides of the pivot base; a middle of the inner axial hole communicates with the delivering channel, and two ends of inner axial hole connects and communicates with the outer axial hole; a bolt and nut assembly passes through and is engaged with the outer axial hole and inner axial hole, wherein a middle of the bolt and nut assembly forms a neck at a position matching with the delivering channel.

12. A shower column with a liftable showerhead, comprising:

a faucet having a main body, wherein the main body has a first outlet hole;

a top base having a connector and an upper base connected to the connector;

an outer rod which is a tube body, wherein two ends of the outer rod are engaged with the main body and the upper base respectively; the first outlet hole faces towards the outer rod, and a front surface of the outer rod has an elongated hole which extends along a longitudinal direction of the outer rod;

a telescopic tube assembly having an inner tube, wherein a bottom end of the inner tube along the longitudinal direction of the outer rod is engaged with the first outlet hole in a sealed way; a liftable tube slidably fits around the inner tube in a sealed way, and has a liftable outlet hole communicating with the inner tube; a spring is provided inside the liftable tube and abuts against a top end of the inner tube along the longitudinal direction of the outer rod to be compressed by the liftable tube; and a showerhead structure having a sprayhead and a connecting base connected to the sprayhead, wherein the sprayhead has a plurality of spraying holes; the connecting base has a connecting channel communicating with the spraying holes; the connecting base passes through the elongated hole and is detachably engaged with the liftable tube; the connecting channel communicates with the liftable outlet hole;

wherein the main body has a valve and an inlet hole communicating with the first outlet hole which is controlled by the valve; the inlet hole faces towards the outer rod; an inlet channel is formed in the connector and the upper base; an inlet pipe is provided in the outer rod, wherein a top end of the inlet pipe away from the faucet is connected to a front end of the inlet channel which faces towards the top base in a sealed way, and a bottom end of the inlet pipe which faces towards the faucet is engaged with the inlet hole in a sealed way.

* * * * *